United States Patent
Hall et al.

(10) Patent No.: US 8,126,969 B1
(45) Date of Patent: Feb. 28, 2012

(54) POLICY BASED DISSEMINATION CONTROL OF ELECTRONIC MESSAGES

(75) Inventors: Robert J. Hall, Berkeley Heights, NJ (US); Joseph Michael Sommer, Rutherford, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1059 days.

(21) Appl. No.: 11/075,568

(22) Filed: Mar. 8, 2005

(51) Int. Cl.
 *G06F 15/16* (2006.01)
 *G06F 17/30* (2006.01)
(52) U.S. Cl. .................................... 709/206; 726/26
(58) Field of Classification Search .................. 709/204, 709/217–219, 205–207; 726/26–33, 1; 705/901, 705/50–54
See application file for complete search history.

(56) References Cited

U.S. PATENT DOCUMENTS

| | | | |
|---|---|---|---|
| 5,958,005 A | 9/1999 | Thorne et al. | |
| 6,230,186 B1 | 5/2001 | Yaker | |
| 6,721,784 B1 | 4/2004 | Leonard et al. | |
| 6,769,067 B1 | 7/2004 | Soong | |
| 7,143,445 B1* | 11/2006 | Ishiguro et al. | 726/31 |
| 7,590,856 B2* | 9/2009 | Morino et al. | 713/182 |
| 2003/0233410 A1 | 12/2003 | Gusler et al. | |
| 2004/0049462 A1* | 3/2004 | Wang | 705/50 |
| 2004/0177271 A1* | 9/2004 | Arnold et al. | 713/201 |
| 2005/0086326 A1* | 4/2005 | Manning et al. | 709/219 |
| 2005/0097353 A1* | 5/2005 | Patrick et al. | 713/200 |

OTHER PUBLICATIONS

Jaehong Park, Ravi Sandhu, Originator Control in Usage Control, Proceeding of the 3rd International Workshop on Policies for Distributed Systems and Networks, p. 60, IEEE Computer Society 2002, p. 60-66.*

* cited by examiner

*Primary Examiner* — Chirag Patel (57) ABSTRACT

Disclosed is a system and method for policy based dissemination control of controlled content (e.g., electronic messages). Upon detection at a receiving device that a user is attempting further dissemination (e.g., forwarding) of controlled content, the receiving device sends a query to a policy control server. The policy control server uses the information received in the query to perform a database lookup in order to determine dissemination control instructions. The dissemination control instructions are sent to the receiving device and the receiving device enforces the instructions with respect to the attempted dissemination. The dissemination control instructions may, for example, allow further dissemination, deny further dissemination, or allow further dissemination only upon receipt of permission from the content owner. The dissemination control instructions may also indicate that the content owner is to be notified of the attempted dissemination.

20 Claims, 6 Drawing Sheets

| CONTENT OWNER | RECIPIENT/DISSEMINATOR | ALLOW ? | NOTIFY ? |
|---|---|---|---|
| SMITH@ABC.NET | JONES@XYZ.NET | YES | YES |
| SMITH@ABC.NET | RILEY@WORK.COM | PERMISSION | NO |
| JONES@XYZ.NET | ABC@123.NET | NO | YES |

FIG. 7

POLICY BASED DISSEMINATION CONTROL OF ELECTRONIC MESSAGES

BACKGROUND OF THE INVENTION

The present invention relates generally to electronic messaging, and more particularly to policy based dissemination control of electronic messages.

Electronic communication, in its various forms, is becoming an increasingly popular means of communication. The growth of the Internet, as well as other data and voice networks, allows for widespread dissemination of information. It is easy for users around the world to quickly and efficiently share information, including voice, data, multimedia, etc. The simplest form of such communication is point-to-point communication, in which a sender transmits information to a recipient. Also available is point-to-multipoint, in which a sender transmits information to multiple recipients (also called multicast). Such global connectivity, while certainly providing many benefits, also presents certain problems. One such problem is the loss of control of information once a sender inserts information into a data network. For example, using email, a sender may send information to an intended recipient. However, once received by the recipient, that recipient may further disseminate the information to other recipients without the consent of the sender. While this problem is not unique to electronic communication, the ease and speed with which electronic communications can be duplicated and disseminated make the problem more acute in the electronic communication domain. The "forward" function of many email clients makes the further dissemination of electronic messages a simple matter of clicking a single icon on a computer screen. Coupled with the widespread use of electronic address books, and group mailing lists, the "forward" function of an email client makes widespread dissemination of any information sent via an email system a distinct possibility.

The uncontrolled dissemination problem is not unique to electronic mail. Any electronic messaging system is susceptible to the same problem. Consider traditional voicemail for example. When a caller leaves a voicemail message on a recipients voicemail system, the information in the voicemail message is subject to dissemination via the forwarding function of the voicemail system. Like the email systems described above, voicemail systems also have forwarding functionality, as well as the ability to simultaneously forward messages to multiple recipients. Similarly, instant message systems, which are becoming increasingly popular, also have the same information dissemination capabilities. In fact, almost any type of electronic communication suffers from the problem that once information is inserted into the network, the original content provider (i.e., the message sender) loses control of the information, and the information is subject to unwanted dissemination.

There have been prior attempts at controlling such unwanted disseminations. One attempted solution is to add privacy markings to electronic and voice mail messages such that when a recipient views or listens to the message, the recipient is notified that the message sender considers the message private. However, such privacy markings are often overlooked or ignored.

In the email domain, prior attempts have suggested dissemination control by adding privacy attributes to email messages. For example, U.S. Pat. No. 6,230,186 suggests a system where upon receipt of an email message with a privacy attribute, the receiving computer system limits further processing of the message based on the privacy attribute. U.S. Pat. No. 5,958,005 suggests a system in which the message sender adds a security parameter in a message header, where the message header includes instructions as to whether forwarding of the message is permitted. Similar attempts in the email domain have required the approval of the original message sender prior to further dissemination. For example, U.S. Patent Application Publication 2003/0233410 suggests that permission from the original author may be required prior to allowing a blind carbon copy (BCC) recipient to further forward a received email message.

While the prior approaches provide some control over email dissemination, they fail to address the broader problem of electronic communications in general. Further, the prior approaches provide privacy on a per email basis, but fail to provide an overall integrated approach to electronic information dissemination control.

BRIEF SUMMARY OF THE INVENTION

The present invention provides for improved policy based dissemination control of controlled content. In accordance with an embodiment of the invention, content dissemination control is based upon policy rules stored in (or accessible to) a policy control server. Upon detection that a user is attempting dissemination of controlled content, a query is sent to the policy control server. The query comprises dissemination attempt information, such as the message sender, the message recipient, a description of the message content, or other information about the dissemination attempt or content. The policy control server uses the information received in the query to perform a database lookup in order to determine dissemination control instructions. The dissemination control instructions indicate whether the attempted dissemination of the controlled content is allowed.

In one embodiment, the controlled content is an electronic message. In this embodiment, upon detection at a receiving device that a user is attempting further dissemination (e.g., forwarding) of a received message, the receiving device sends a query comprising dissemination attempt information to the policy control server. The policy control server uses the information received in the query to perform a database lookup in order to determine dissemination control instructions. The dissemination control instructions are sent to the receiving device and the receiving device enforces the instructions with respect to the attempted dissemination.

In one embodiment, the database contains message parameters and associated dissemination control instructions. The message parameters comprise stored data and are matched against the dissemination attempt information received in the query. When a matching record is found in the database, the associated dissemination control instructions are returned to the receiving device so that the dissemination control policy may be enforced. The dissemination control instructions may, for example, allow further dissemination, deny further dissemination, or allow further dissemination only upon receipt of permission from the message sender. The dissemination control instructions may also indicate that the message sender is to be notified of the attempted dissemination.

The principles of the present invention may be applied in various types of messaging systems (electronic or otherwise). For example, the principles of the present invention may be applied in an electronic mail system, where an email client is the receiving device, and the policy control server provides dissemination control instructions when an email recipient attempts to further disseminate all or part of a received email message. Similarly, the principles of the present invention may be applied in a voicemail system, where the voicemail system is the receiving device, and the policy control server provides dissemination control instructions when a voicemail recipient attempts to further disseminate all or part of a received voicemail message. One skilled in the art will recognize that the principles of the present invention may be applied in various types of systems in which control of dissemination of content is desired.

The present invention is advantageous in that it also provides for an integrated approach for instituting a broad range of policies over multiple networks and multiple devices. For example, a single policy control server may service various types of systems so that users of the various systems can set up a dissemination policy in one database for various types of messages and/or content. For example, a particular user may deny further dissemination of any content sent to another particular user, whether that content takes the form of an email, voicemail, instant message, or any other type of message or content. The devices supporting the various messaging systems may all have access to a centralized policy control server.

These and other advantages of the invention will be apparent to those of ordinary skill in the art by reference to the following detailed description and the accompanying drawings.

DETAILED DESCRIPTION

Figure 1:
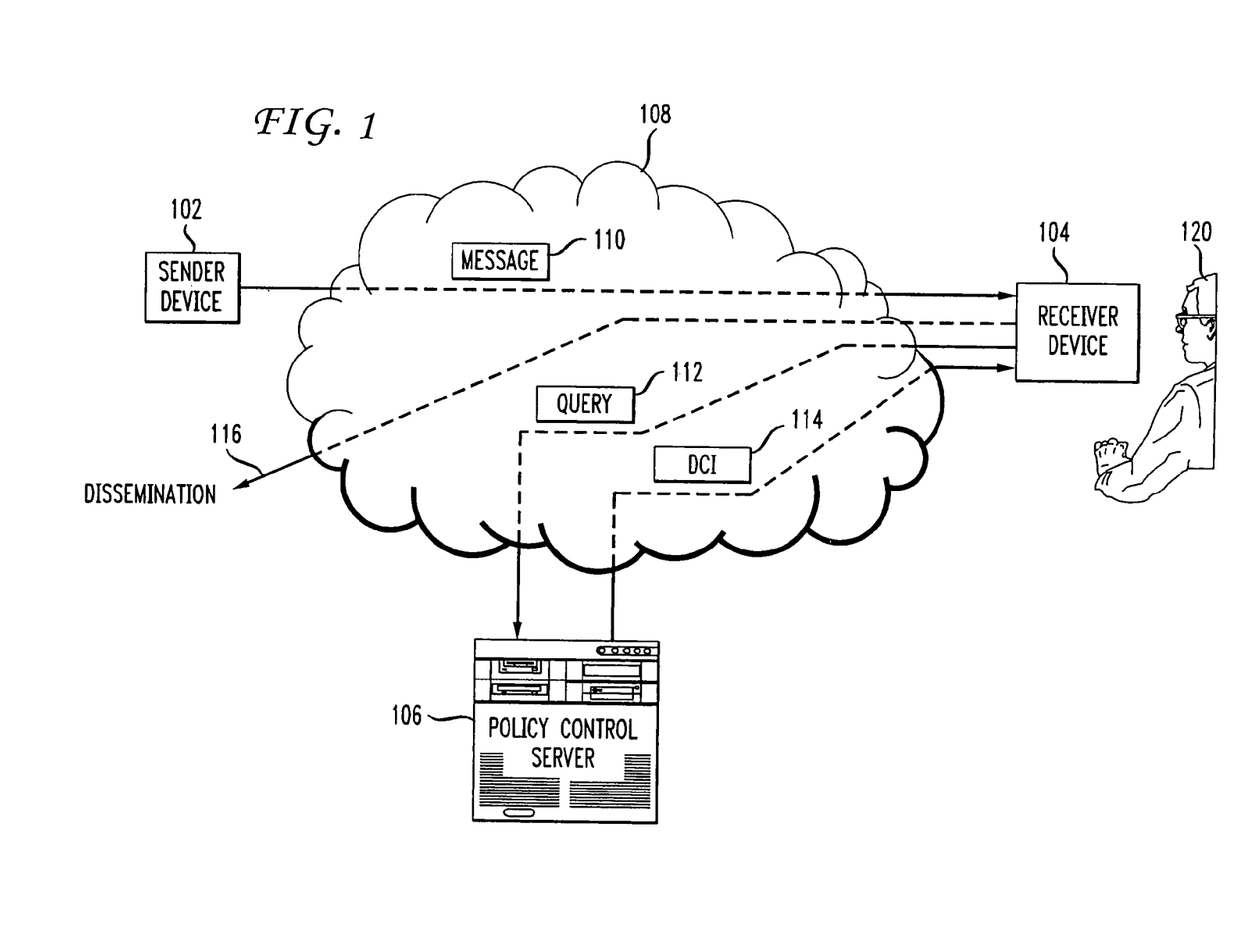
FIG. 1 shows a high level block diagram of a network configuration in accordance with an embodiment of the invention.

FIG. 1 shows a high level block diagram of a network configuration in accordance with the principles of the present invention. Further details regarding particular embodiments of the invention will be described in further detail in connection with FIGS. 2-7. FIG. 1 shows a sender device 102 which may communicate with other devices (e.g. receiver device 104) via network 108. Sender device 102 may be any type of electronic communication device which is able to send messages to other electronic communication devices via a network.

The present invention provides a method and apparatus for a message sender to control further dissemination of a sent electronic message. Consider sender device 102 which transmits an electronic message 110 to receiver 104 via network 108. The message, upon receipt at receiver device 104, will often be stored in a memory unit of the receiver device 104. For example, if receiver device 104 is a computer receiving an email message, then the email message may be stored on a magnetic disk drive of the computer. Once stored in the receiver device 104, it becomes very easy for a user to duplicate and disseminate the message, while the sender loses control over such dissemination. While the present description describes the invention generally in terms of electronic messages, it is to be understood that the principles of the present invention may be applied to any type of content for which dissemination is to be controlled. Thus, while the description herein focuses mainly on message senders and message recipients, it is to be understood that the principles of the present invention are applicable to the dissemination control of any content owned by a content owner and wherein another person is attempting to disseminate such content owned by another content owner.

In accordance with the principles of the present invention, receiver device 104 is configured such that an attempt to further disseminate all or part of the message at receiver device 104 initiates an access to a network policy control server 106. This access may be in the form of a query 112 which contains various information about the message, for example the message sender, the message recipient, a description of the message content, the time of attempted dissemination, or any other information about the message or attempted dissemination (i.e., dissemination attempt information). Policy control server 106 has access to a database which stores policy information indicating whether messages may be further disseminated by the receiver device 104, or by a user 120 of receiver device 104. As is known in the art, the user of a device can be determined with confidence through authentication techniques, such as username/password querying, cryptographic signatures or tokens, or even biometric tests. The policy control server 106 performs a database lookup based on the received query, and responds to the receiver device 104 with a dissemination control instruction (DCI) 114 which contains instructions regarding permitted dissemination of the message (or part of the message). If the dissemination control instruction 114 indicates that the message may not be further disseminated, then the receiver device 104 is unable to further transmit the message. If the dissemination control information 114 indicates that the message may be further disseminated, then the receiver device 104 may further disseminate (on behalf of user 120) the message to other recipients as represented by 116. Although shown in FIG. 1 as a single entity, the policy control server 106 may be implemented in various ways, including in a distributed fashion across multiple network elements.

The principles of the present invention, as described in connection with FIG. 1, are applicable to any type of communication network 108 (or multiple interconnected networks), any type of message or content, and any type of sending and receiving devices. Several particular embodiments will be described below.

Figure 2:
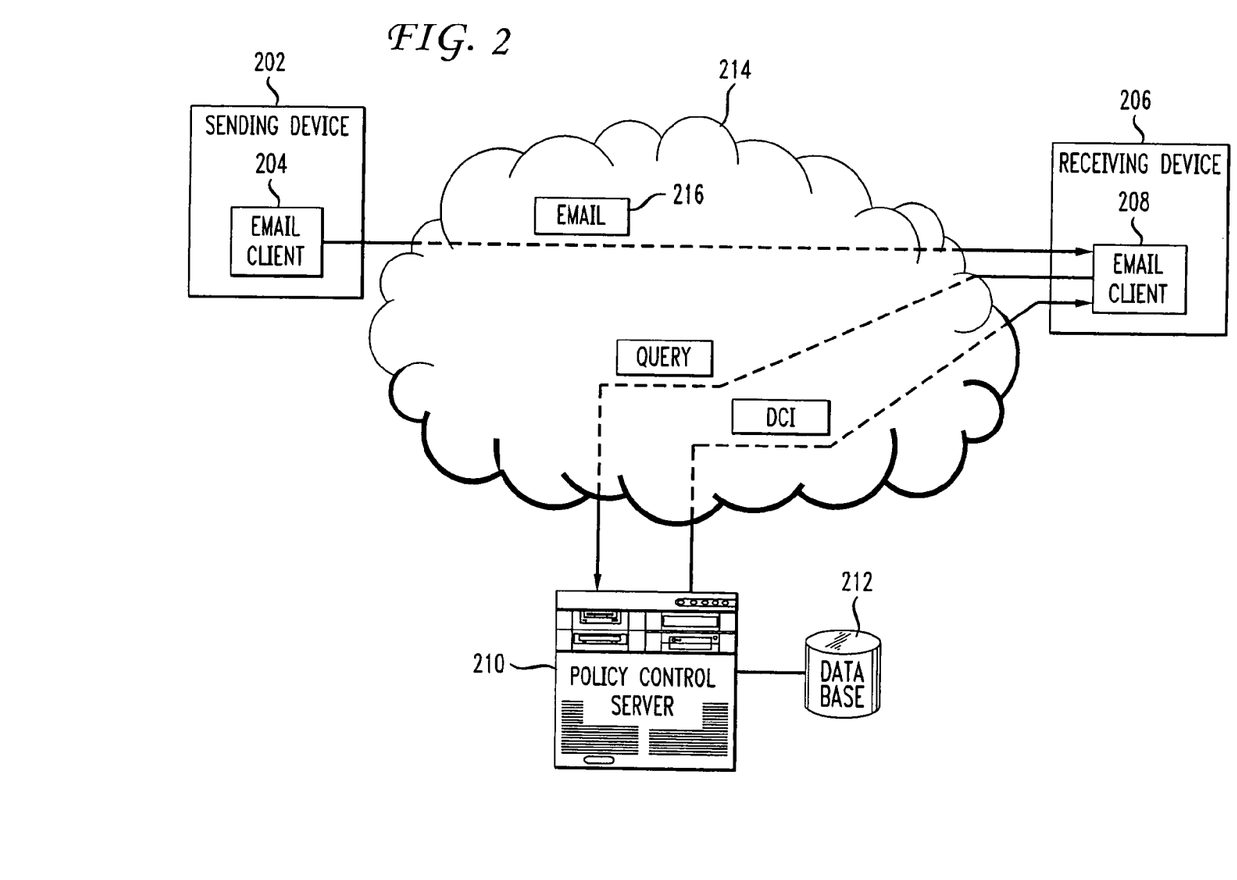
FIG. 2 shows a network configuration in which an electronic mail embodiment of the invention may be implemented.
Figure 3:
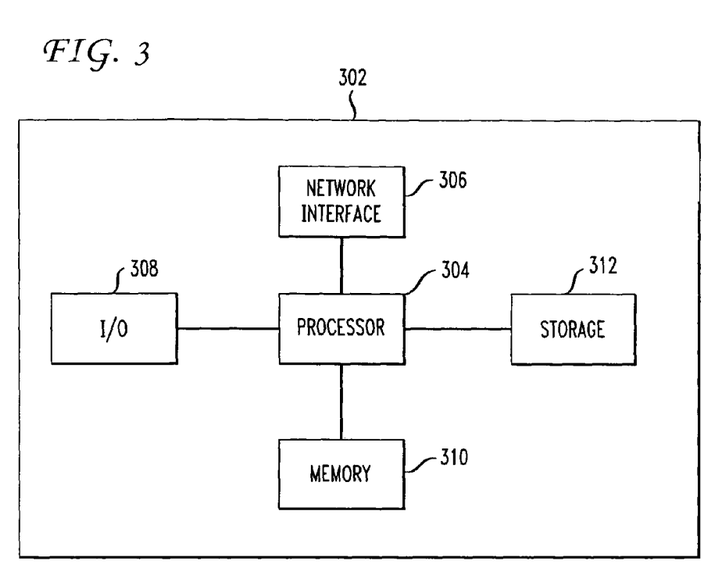
FIG. 3 shows a high level block diagram of a computer system which may be used in an embodiment of the invention.
Figure 4:
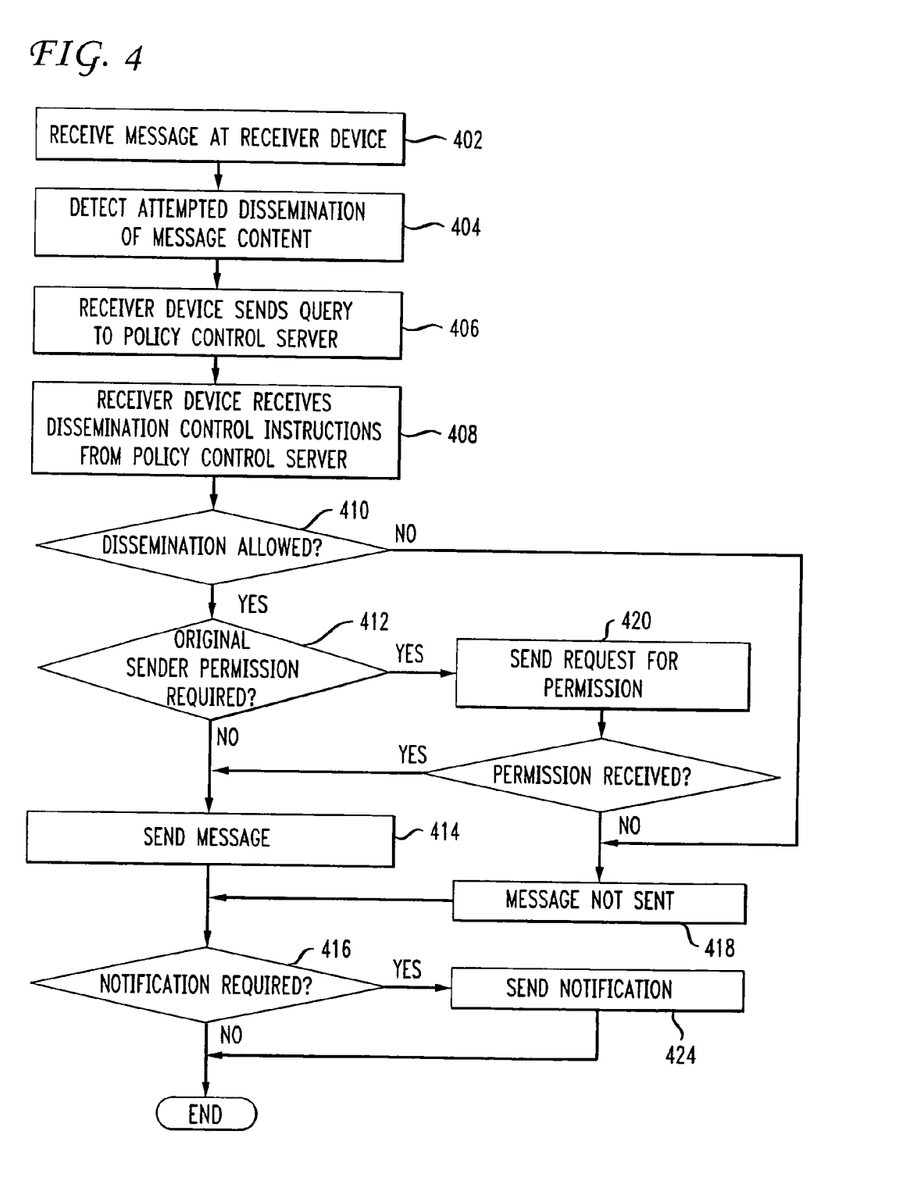
FIG. 4 is a flowchart showing the steps performed by a receiving device in accordance with an embodiment of the invention.

First, an electronic mail embodiment will be described in conjunction with FIG. 2 which shows a network configuration in which an electronic mail embodiment of the invention may be implemented. Sending device 202 and receiving device 206 are computers executing email clients 204 and 208 respectively. Such computers executing email clients are well known in the art, and may be implemented, for example, using a well known computer processors, memory units, storage devices, computer software, and other components. For example, the email client may be Microsoft Outlook executing on a desktop or laptop computer. A high level block diagram of such a computer is shown in FIG. 3. Computer 302 contains a processor 304 which controls the overall operation of computer 302 by executing computer program instructions which define such operation. The computer program instructions may be stored in a storage device 312 (e.g., magnetic disk) and loaded into memory 310 when execution of the computer program instructions is desired. Thus, the email client application will be defined by computer program instructions stored in memory 310 and/or storage 312 and the email client application will be controlled by processor 304 executing the computer program instructions. Computer 302 also includes one or more network interfaces 306 for communicating with other devices via a network. Computer 302 also includes input/output 308 which represents devices which allow for user interaction with the computer 302 (e.g., display, keyboard, mouse, speakers, buttons, etc.). One skilled in the art will recognize that an implementation of an actual computer will contain other components as well, and that FIG. 3 is a high level representation of some of the components of such a computer for illustrative purposes.

In operation, sending device 202 may create an electronic message (i.e., email) using its email client 204 and transmit the email message 216 to the email client 208 of receiving device 206 via network 214. Network 214 may be a single data network, or multiple interconnected data networks. In one embodiment, data network 214 may be the Internet. Email message 216 will contain various information content as created by the sender, and email message 216 will also contain various other information (generally in a header portion of the message) which is used by the network and the email clients in order to manage the transmission of email message 216 from the sending device 202 to the receiving device 206 via network 214. The configuration of an email message is well known according to various well known electronic mail standards, the details of which will not be described herein.

Upon receipt of the message 216, email client 208 will process the message, and will typically notify a user of receiving device 206 that a message has been received. The user of receiving device 206 may read the message, and may store the message in receiving device 206 for later retrieval via email client 208. The steps performed by receiving device 206 and email client 208 will now be described in further detail in connection with the flowchart of FIG. 4. First, in step 402, the message is received as described. Next, as represented by step 404, the email client 208 is configured to detect any attempted further dissemination of the email message or its content. This further dissemination may take several forms. For example, the user may use the standard "forward" command of an email client in order to send a copy of the received email message to another third party recipient. Alternatively, the user may use standard "cut and paste" functionality of a computer to copy portions of the content of the email 216 into a new message. When using this cut and paste functionality, many software applications have the capability of associating content creator information with the copied information. The email client may be configured to check the content creator information embedded in email messages to detect an attempted dissemination of a received email message (or part thereof).

Upon detection of an attempted further dissemination of email message 216, the email client 208 sends a query to policy control server 210 in step 406. This query may be sent, for example, using the well known Hypertext Transfer Protocol (HTTP). Policy control server 210 is a network element which stores various electronic messaging dissemination policies, and upon receipt of queries from various network devices, responds with dissemination control instructions. The various policies are stored in database 212 which is shown connected to policy control server 210 in FIG. 2. Policy control server 210 may be implemented using a well known computer system in the same manner as described above in conjunction with FIG. 3, using a processor, network interface, memory, storage, and I/O. In the policy control server 210 implementation, the computer program instructions stored in memory and storage would define the operation of the policy control server as described herein. It is noted that database 212 is shown in FIG. 2 as an external component connected to policy server 210. However, in various alternative embodiments, the database 212 may be internal to policy control server 210 (e.g. stored in internal memory or storage), may be an externally connected device as shown in FIG. 2, or may be a stand-alone network node which the policy control server 210 accesses via a network interface.

Figure 5:
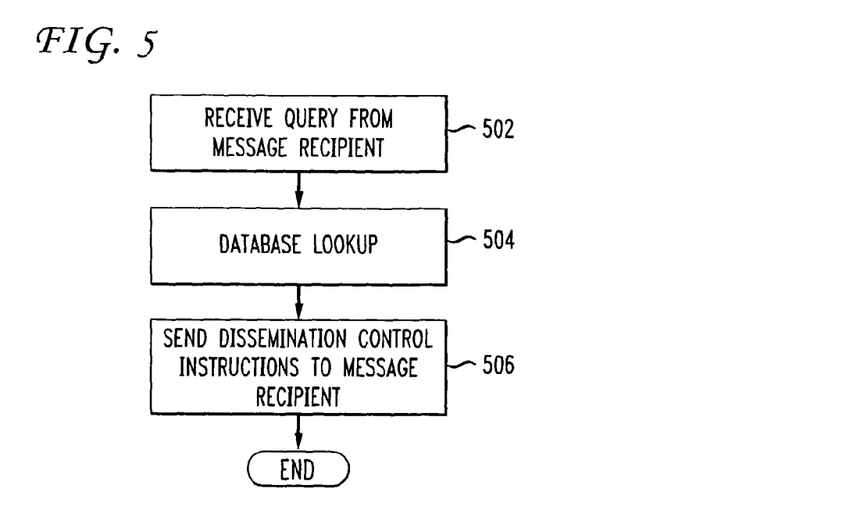
FIG. 5 is a flowchart showing the steps performed by a policy control server in accordance with an embodiment of the invention.

Turning now to the operation of policy control server 210, FIG. 5 is a flowchart showing the steps performed by the policy control server 210. As represented by step 502, policy control server 210 receives the query from the email client 208. In step 504, the policy control server 210 performs a database 212 lookup using the information received in the query. Further details of the database lookup and the generation of dissemination control instructions will be described in conjunction with FIG. 6, which shows one embodiment of a data structure which may be stored in database 212. In accordance with the embodiment of FIG. 6, database 212 contains a relational database 600 containing multiple records, with each record comprising multiple fields. Field 602 identifies the content owner of the electronic message, which is sending device 202 (or the user of sending device 202) in the embodiment being described in connection with FIG. 2. Field 604 identifies the recipient/disseminator of the electronic message, which is receiving device 206 (or the user of receiving device 206). Field 614 contains an indication of whether the attempted dissemination is allowed. In one advantageous embodiment, the allow field 614 may contain the values "yes", "no" and "with permission". The "with permission" value indicates that the attempted dissemination is allowed, but only with prior permission of the content owner. Field 616 contains an indication of whether the content owner should be notified of the attempted dissemination.

Figure 6:
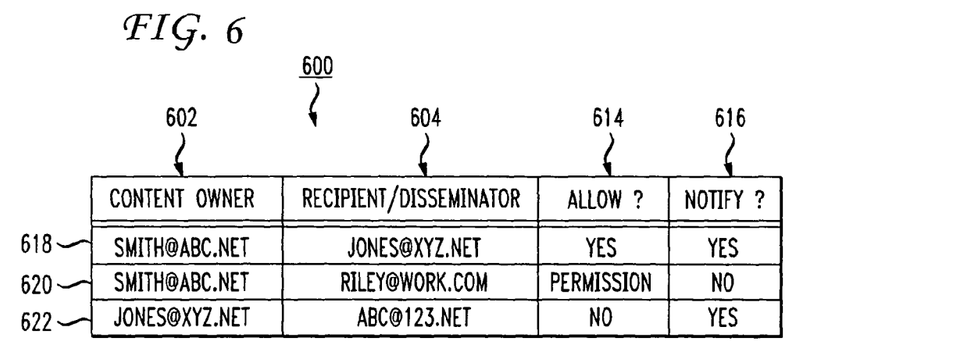
FIG. 6 shows a data structure which may be used to store dissemination policies in a database.

Records 618, 620, 622 show exemplary records which may be stored in database 212. Record 618 indicates that if the content owner is smith@abc.net and jones@xyz.net has received the message and is attempting further dissemination, then the further dissemination is allowed and smith@abc.net should be notified of the further dissemination. Record 620 indicates that if the content owner is smith@abc.net and riley@work.com has received the message and is attempting further dissemination, then permission from smith@abc.net is required prior to further dissemination and riley@work.com does not need additional notification in addition to the request for permission. Record 622 indicates that if the content owner is jones@xyz.net and abc@123.net has received the message and is attempting further dissemination, then further dissemination is not allowed and abc@123.net should be notified of the attempted dissemination. As shown in FIG. 6, fields 602 and 604 contain message parameters, which refers to the information which is matched against the information received via the query from the message recipient. Fields 614 and 616 contain the dissemination control instructions which describe the dissemination policy for the matched message parameters.

The database records shown in FIG. 6 are only illustrative of the principles of the present invention, and one skilled in the art will recognize that many additional fields and other variations are possible. For example, a field indicating the number of times a particular message may be further disseminated may be stored in database 600 along with a counter which is decremented each time the policy control server 210 receives a query indicating an attempted dissemination. The database records may also contain a field indicating a period of time during which the particular rule defined by the database record is effective. The database record may also contain a field indicating whether the content of the original message has been altered. The database record may also contain a field containing a search pattern, which is a string of text which may be matched against the content of the message. One skilled in the art will recognize that many variations of database record fields may be used in order to implement various desired policies. In any of these alternatives, the query transmitted by the receiving device (i.e., the attempting disseminator), must contain the information needed by the policy control server 210 in order to allow comparison to, and evaluation of, the database record fields.

The database records may be populated in various ways. In an advantageous embodiment, users may populate the database in order to enforce a desired dissemination control policy. In one embodiment, users may populate the database using a web interface. Alternatively, the interface to the policy control server database may be built into the message system (e.g., email client, voicemail system, etc.) itself. In yet another alternative, an enterprise may populate the database in order to enforce an enterprise-wide dissemination control policy.

The database records must be designed and evaluated in a manner such that a determination as to whether dissemination is allowed may be unambiguously determined. For example, if the database fields are designed such that more than one record may be matched by a query, an evaluation rule must be known. For example, in the case of multiple matching records, one possible rule is that the first record to be matched determines the outcome. Another possible rule is that more specific rules take precedence over less specific rules. One skilled in the art could readily implement any of a number of well known database design and evaluation rules in order to implement the policy database 212 described herein.

Returning to FIG. 5, upon database record evaluation, the policy control server 210 generates a dissemination control instruction and sends the dissemination control instruction to the email client 208 in step 506. The dissemination control instruction is an instruction which may be interpreted and enforced by the email client 208. In the example of FIG. 2, the email client 208 will receive and enforce the dissemination control instruction as follows.

Returning to FIG. 4, the email client 208 receives the dissemination control instructions from the policy control server in step 408. In step 410 the email client 208 determines, based on the received dissemination control instructions, whether the attempted dissemination is allowed. If it is determined that dissemination is not allowed, then as represented by step 418 the message is not sent and control passes to step 416. If it is determined that dissemination is allowed, then in step 412 it is determined whether permission is required from the original sender prior to dissemination. If permission is not required, then the message is sent in step 414. If permission is required, then in step 420 the email client 208 sends a message to email client 204 requesting permission to further disseminate the original email 216 (or part thereof). If permission is received (e.g., via a return communication) then the message is sent in step 414. If permission is not received, then as represented by step 418 the message is not sent and control passes to step 416. In step 416 the email client 208 determines whether notification is required to be sent to the sending email client 204. If notification is required, then in step 424 notification is sent to email client 204. The notification will be a notification of the action performed by the receiving email client 208 (e.g., message was disseminated, attempted dissemination was blocked). After step 416 or step 424 the method ends.

As described above in conjunction with FIG. 2, the principles of the present invention may be implemented in connection with email messaging. In an alternate embodiment, the principles of the present invention may be implemented in connection with voicemail messaging. This embodiment will now be described in conjunction with FIG. 7. In this embodiment, sending device 702 is a telephone which is able to communicate with receiving telephones 706, 708, 710, 712. Network 720 may be, for example, the Public Switched Telephone Network (PSTN), a wireless telephone network, a voice-over-IP (VoIP) network, or some combination of the above networks. Telephone 702 is shown directly connected to the network 720, and telephones 706, 708, 710 and 712 are shown connected to the network 720 via a private branch exchange (PBX) 704 as would be typical in a business. As is well known, a caller from telephone 702 may place a call to telephone 706 via network 720 and PBX 704. If telephone 706 does not answer, then a typical PBX, such as PBX 704, has voicemail capability such that the user of calling telephone 702 may leave a voicemail message 714 in a voicemail mailbox in PBX 704 associated with telephone 706. Voicemail message 714 may contain various information content as created by the sender, and voicemail message 714 as stored within PBX 704 will also contain various other information (generally in a header portion of the message) which is used by the voicemail system of PBX 704 to manage the messages in the voicemail system. It is noted that voicemail message 714 may also represent a recorded conversation between two or more parties, rather than a message recorded by a single party. The transmission, storage and management of voicemail messages is well known in the art.

Figure 7:
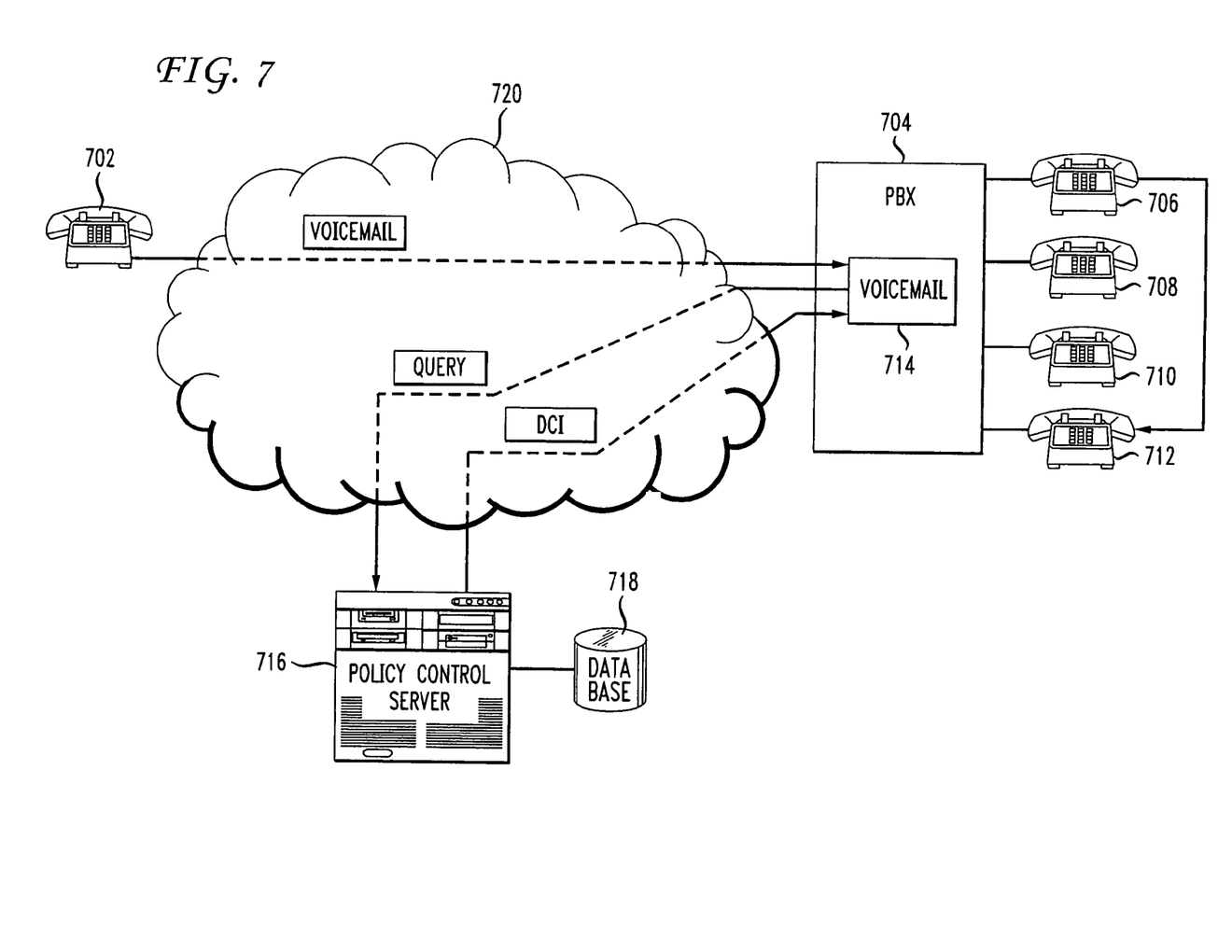
FIG. 7 shows a network configuration in which a voicemail embodiment of the invention may be implemented.

Upon receipt of the voicemail message 714, PBX 704 will typically notify a user of receiving telephone 706 that a message has been received (e.g., by illuminating a voicemail message indicator light on telephone 706). The user of telephone 706 may listen to the message, and may store the message in PBX 704 for later retrieval via telephone 706. In the embodiment of FIG. 7, the PBX 704 will perform the steps shown in FIG. 4 as described above. These steps may be performed by appropriately configuring well known PBX systems in order to implement the functionality according to the present invention. The PBX may be so configured by adding appropriate computer program instructions which are executed by a processor of PBX 704, by adding additional hardware modules to PBX 704, or by a combination of hardware and software. One skilled in the art could readily modify a well known PBX in order to implement the present invention. Returning now to FIG. 4, in step 402 PBX 704 receives and stores the message. Next, as represented by step 404, PBX 704 recognizes any attempted further dissemination of the voicemail message or its content. This further dissemination may take several forms. For example, the user may use the standard "forward" command of a voicemail system in order to send a copy of the received voicemail message to another third party recipient.

Upon detection of an attempted further dissemination of voicemail message 714 in step 404 (for example forwarding the voicemail from telephone 706 to telephone 712), the PBX 704 sends a query to policy control server 716 in step 406. Policy control server 716 and its associated database 718 are configured, and operate, as described above in conjunction with FIG. 5. It is noted that with respect to the query sent from the PBX 704 to the policy control server 716, the query may be sent via network 720, or may be sent via a separate network. For example, in the embodiment in which network 720 is the PSTN, the PBX 704 may contain a separate network interface for communicating with the policy control server 716 via a separate data network. With respect to the policy records stored in database 718, the records will be similar to the records described in conjunction with FIG. 6 and the email embodiment of FIG. 2. However, in accordance with the telephone voicemail embodiment of FIG. 7, the content owner field 602 would contain an identification (e.g., telephone number) of sending telephone 702, and the recipient/disseminator field 604 would contain an identification (e.g., telephone number) of receiving telephone 706.

Returning to FIG. 4, the processing of received dissemination control instructions by PBX 704 proceeds as described above in connection with steps 408 through 424 of FIG. 4. In the voicemail embodiment, any required request for permission in accordance with steps 420 and 422 may be sent to telephone 702 via network 720, and the instructions may be input by a user of telephone 702 using telephone keypad (e.g., DTMF tones) instructions. Any required notification in accordance with step 424 may be in the form of a voice recording transmitted to telephone 702.

Having described two embodiments (email message (FIG. 2), and voicemail message (FIG. 7)) one skilled in the art will recognize that the principles of the present invention may be applied to any type of electronic communication. Returning to FIG. 1, for example, sender device 102 may be any type of electronic communication device which is able to send electronic messages to other electronic communication devices via a network. For example, and without limitation, such devices may be telephones (wired or wireless), computers, cable/satellite boxes, personal digital assistants (PDA), wireless email devices, etc. The messages may be, for example, email, voice, text or multimedia. Network 108 may be a single network, or multiple interconnected networks, and may be different types of networks such as voice, data, wireless, etc. In yet other alternatives, the principles of the present invention may be applied in connection with various other types of messages and content, and such messages and content may be transmitted via various means of communication, including non-electronic means, such as optical communication or otherwise.

One benefit of the present invention is that the policy control server may be used to institute a broad range of policies over multiple networks and multiple devices. Further, users may implement a single policy for use over multiple types of media. In one possible embodiment, a single policy control server may be used by various types of devices. For example, email messaging clients may access the policy control server in order to control dissemination of email messages, while a voicemail system may access the same policy control server in order to control dissemination of voicemail messages. In accordance with one advantage of the invention, the same policy rules may be used to define dissemination rules for particular users. For example, a user X may set up a record in the policy control server database that indicates that any electronic message sent from user X to a user Y may not be further disseminated by user Y. Thereafter, both the email client of user Y and the voicemail system of user Y will both receive dissemination control instructions from the policy control server based upon the same policy record. This is just one example of the flexibility and integration afforded by the present invention.

In yet another embodiment of the invention, the content of electronic messages may be identified by an embedded content owner identification. In this manner, when content from multiple content owners is combined into a single message for dissemination, the sending device will recognize the multiple content owners and may send an appropriate query to the policy control server. There are various ways for handling multiple content owners. For example, the policy rules of each of the content owners may be enforced, with the most restrictive rule winning in the case of a conflict between rules.

In yet further embodiments, the principles of the present invention may be implemented for a chain of multiple dissemination actions. For example, the above embodiments describe a message being sent from a sender and received at a recipient, where the recipient attempts a dissemination to a third party. The dissemination processing of the present invention may also be applied to further dissemination attempts by the third party.

In yet other alternative embodiments, owned content elements can be acquired through means other than receipt of a single message from the content owner. For example, one can receive content elements from a third party embedded in or attached to a message. However, there need be no particular messaging involved. For example, content can be acquired through data aggregation and summarization or mining. For example, an RFID (Radio Frequency Identification) system can wirelessly record arrival, departure, sale, and movement events of physical objects such as merchandise in a warehouse or retail store. Consumer behavior, such as market basket buying information or video rental records, can be recorded in a corporate database. Medical information about a patient can be aggregated and stored in medical records data warehouses, gathered through diverse inputs such as lab reports, doctors' notes, and emergency room records. In all these cases, a client software program can be used that extracts summaries and other views of this data from the databases and then disseminates it as messages, web pages, market summary reports, etc. Such client programs (for example; database management systems, data mining systems, or web-based information appliances) can be enhanced according to the principles of the present invention to detect dissemination attempts of the content, associate extracted content with its rightful owner (e.g., the consumer, medical patient, or a corporate entity), formulate a query to a policy control server containing dissemination attempt information, and subsequently obtain and carry out dissemination control instructions.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for message processing at a receiving device comprising:
    receiving a message from a sender;
    sending a query comprising dissemination attempt information and a portion of content of the message to a network server;
    receiving a dissemination control instruction from the network server in response to the query, the dissemination control instruction based at least on a first dissemination rule determined by an evaluation rule configured to select one of a plurality of applicable dissemination rules, the plurality of applicable dissemination rules defined by the sender and including a dissemination rule related to a number of times the message may be disseminated, a dissemination rule that is effective only during a specified time period, and a dissemination rule related to a search pattern that may be matched against the portion of content of the message;

transmitting a request for dissemination permission to the sender if the dissemination control instruction comprises a permission instruction; and allowing dissemination of the message to another recipient only upon receipt of a permission message from the sender.

2. The method of claim 1 further comprising:
transmitting a notification to the sender if the dissemination control instruction comprises a notification instruction.

3. The method of claim 1 further comprising:
allowing dissemination of the message to another recipient only if the dissemination control instruction comprises an indication that message dissemination is allowed.

4. The method of claim 1 wherein the message is one of an email message, a voicemail message and an instant message.

5. The method of claim 1 wherein the receiving device is a telephone voicemail system.

6. The method of claim 1 wherein the receiving device is a computer.

7. The method of claim 1 wherein the sending is performed in response to detecting an attempted dissemination of the message received.

8. A method for operation of a network server comprising:
receiving a query from a message recipient, the query comprising information about a message received by the message recipient including a portion of content of the message;

performing a database lookup in response to the query to determine a dissemination control instruction for the message, the dissemination control instruction based at least on a first dissemination rule determined by an evaluation rule configured to select one of a plurality of applicable dissemination rules, the plurality of applicable dissemination rules defined by a sender of the message received by the message recipient and including a dissemination rule related to a number of times the message may be disseminated, a dissemination rule that is effective only during a specified time period, and a dissemination rule related to a search pattern that may be matched against the portion of content of the message; and sending the dissemination control instruction to the message recipient;

transmitting a request for dissemination permission to the sender if the dissemination control instruction comprises a permission instruction; and allowing dissemination of the message to another recipient only upon receipt of a permission message from the sender.

9. The method of claim 8 wherein the message recipient is a voicemail system.

10. The method of claim 8 wherein the message recipient is an email server.

11. The method of claim 8 wherein the query comprises an indication of the sender of the message.

12. A network server comprising:
an interface for receiving a query from a message recipient, the query comprising information about a message received by the message recipient and a portion of content of the message;

means for accessing a database comprising message parameters and associated dissemination control instructions, each of the dissemination control instructions based at least on a first dissemination rule determined by an evaluation rule configured to select one of a plurality of applicable dissemination rules, the plurality of applicable dissemination rules defined by a sender of the message received by the message recipient and including a dissemination rule related to a number of times the message may be disseminated, a dissemination rule that is effective only during a specified time period, and a dissemination rule related to a search pattern that may be matched against the portion of content of the message; and an interface for transmitting dissemination control instructions to the message recipient in response to the query;

means for transmitting a request for dissemination permission to the sender if the dissemination control instruction comprises a permission instruction; and means for allowing dissemination of the message to another recipient only upon receipt of a permission message from the sender.

13. The network server of claim 12 wherein the database is an internal component of the network server.

14. The network server of claim 12 wherein the database is external to the network server and the means for accessing comprises a network interface.

15. The network server of claim 12 wherein the message recipients comprise at least two different types of messaging devices.

16. The network server of claim 15 wherein the at least two different types of messaging devices comprise an email client and a voicemail system.

17. A method for controlling the dissemination of controlled content comprising:
detecting a dissemination attempt of controlled content;

sending a query comprising dissemination attempt information to a policy control server including a portion of the controlled content; and receiving a dissemination control instruction from the policy control server in response to the query, the dissemination control instruction based at least on a first dissemination rule determined by an evaluation rule configured to select one of a plurality of applicable dissemination rules, the plurality of applicable dissemination rules defined by an owner of the controlled content and including a dissemination rule related to a number of times the controlled content may be disseminated, a dissemination rule that is effective only during a specified time period, and a dissemination rule related to a search pattern that may be matched against the portion of the controlled content;

transmitting a request for dissemination permission to the owner of the controlled content if the dissemination control instruction comprises a permission instruction; and allowing dissemination of the controlled content only upon receipt of permission from the owner.

18. The method of claim 17 further comprising:
allowing dissemination of the controlled content only if the dissemination control instruction comprises an indication that dissemination is allowed.

19. The method of claim 17 further comprising:
transmitting a notification to the owner of the controlled content if the dissemination control instruction comprises a notification instruction.

20. The method of claim 17 wherein the controlled content comprises multiple media types.

* * * * *